No. 709,474. Patented Sept. 23, 1902.
H. E. DOWNING.
ANIMAL POKE.
(Application filed Jan. 14, 1902.)
(No Model.)
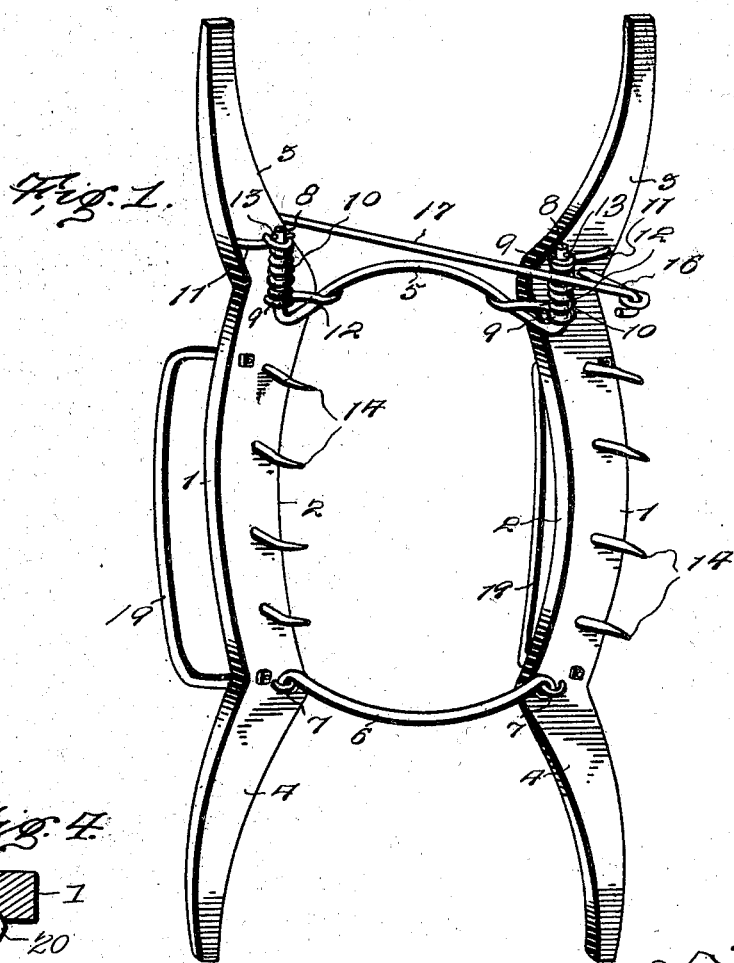
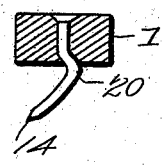
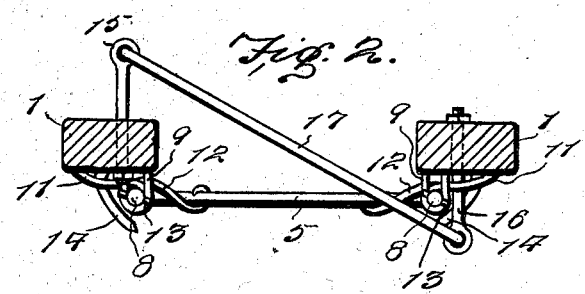
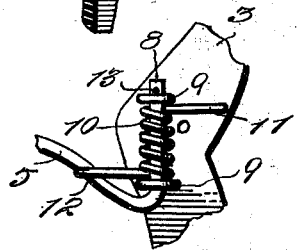
Witnesses
Horatio E. Downing Inventor
by
Attorneys

UNITED STATES PATENT OFFICE.

HORATIO EDWARD DOWNING, OF REEDING, OKLAHOMA TERRITORY.

ANIMAL-POKE.

SPECIFICATION forming part of Letters Patent No. 709,474, dated September 23, 1902.

Application filed January 14, 1902. Serial No. 89,720. (No model.)

*To all whom it may concern:*

Be it known that I, HORATIO EDWARD DOWNING, a citizen of the United States, residing at Reeding, in the county of Kingfisher and Territory of Oklahoma, have invented a new and useful Animal-Poke, of which the following is a specification.

The invention relates to improvements in animal-pokes.

The object of the present invention is to improve the construction of animal-pokes and to provide an exceedingly simple and inexpensive one adapted to effectually prevent an animal from breaking through fences, hedges, and other barriers and capable also of preventing a cow from milking or sucking herself.

The invention consists in the construction and novel combination and arrangement of parts hereinafter fully described, illustrated in the accompanying drawings, and pointed out in the claims hereto appended.

In the drawings, Figure 1 is a perspective view of an animal-poke constructed in accordance with this invention. Fig. 2 is a horizontal sectional view. Fig. 3 is a detail perspective view illustrating the manner of mounting the springs for holding the spurs or projections normally out of engagement with the animal. Fig. 4 is a detail sectional view illustrating the manner of mounting the spurs or projections.

Like numerals of reference designate corresponding parts in all the figures of the drawings.

1 1 designate a pair of upright bars having curved intermediate portions 2 and provided with upper and lower arms 3 and 4, curved outward and diverging, as clearly illustrated in Fig. 1 of the accompanying drawings. The intermediate portions of the bars have concave inner edges to conform to the configuration of the neck of a cow or other animal, and the bars are connected at the terminals of the intermediate portions by upper and lower transverse supporting-bars 5 and 6, curved in opposite directions to conform to the configuration of the neck of the animal and coöperating with the intermediate portions of the bars 1 to form a yoke. The lower bar 6 is provided at its ends with eyes which are linked into eyes of bolts 7, extending through the bars 1 and provided at the opposite faces thereof with nuts.

The upper transverse bar is provided at its ends with pintles 8, arranged in upper and lower eyes 9, preferably formed by staples and arranged at the rear faces of the bars 1 at the upper ends of the intermediate portions thereof. The pintles receive coiled springs 10, located between and resting upon the eyes 9 and provided with oppositely-disposed arms 11 and 12, engaging the upright bars or sides 1 and the transverse bar 5. The springs are retained on the pintles by suitable keys or fastening devices 13, and they are adapted to hold a series of spurs or projections 14 normally out of engagement or away from the animal. Should the animal attempt to force its way through a fence, hedge, or other barrier, the spurs or projections 14, which are slightly curved, will be forced into the animal and the latter will be effectually deterred from advancing or forcing itself through such barrier.

In order to cause the sides or bars 1 to rotate or turn simultaneously to force the spurs or projections into the animal, the said bars are provided with oppositely-disposed arms 15 and 16, extending, respectively, from the inner or rear face of one side or bar and from the front or outer face of the other side or bar, and they are connected by a rod 17, having eyes or hooks linked into eyes of the said arms 15 and 16 and forming hinge connections. The arms 15 and 16 preferably consist of elongated rods or bolts having threaded ends and provided with nuts. These oppositely-disposed arms and the connecting-rod cause the sides or bars 1 to turn inward and outward simultaneously.

The sides or bars are provided at their outer or front faces with oblong loops or frames 19, extending from the lower ends of the intermediate portions to points near the upper terminals of the same and consisting of rods having their ends bent approximately at right angles to form the upper and lower ends of the loops. The ends of the loops are extended through the sides or bars 1 and are threaded for the reception of nuts. The loops project outward or forward, and should a cow attempt to suck or milk herself her head will come in contact with one or the other of the loops and the bars will be simultaneously turned or partially rotated to force the spurs or projections into the animal. The loops and the means for simultaneously turning or partially rotating the bars or sides 1 can be removed, as the parts are readily detachable, when it is desired to apply the animal-poke simply for the purpose of preventing an animal from breaking through fences or other barriers.

It will be seen that the animal-poke is exceedingly simple and inexpensive in construction, that it is positive and reliable in operation, and that it is capable of effectually preventing animals from breaking through fences and other barriers and of preventing a cow from sucking or milking herself.

The spurs or projections, which may be formed in any suitable manner, preferably consist of wire nails arranged as shown in Fig. 4 and provided between their ends with bends 20, seated in suitable recesses of the sides or bars 1, whereby they are prevented from twisting or turning should the bars shrink or swell. I desire it to be understood that various changes in the form, proportion, size, and the minor details of construction within the scope of the appended claims may be resorted to without departing from the spirit or sacrificing any of the advantages of this invention.

What I claim is—

1. An animal-poke comprising sides having spurs or projections, upper and lower connecting-bars hinged to the sides, and springs for holding the spurs or projections normally away from an animal, substantially as described.

2. An animal-poke comprising sides having spurs or projections, upper and lower connecting-bars hinged to the sides, one of the connecting-bars being provided with extended pintles, and coiled springs disposed on the extended pintles, and having arms engaging the sides and the adjacent connecting-bar, substantially as described.

3. An animal-poke comprising sides having spurs or projections, means for hingedly connecting the sides, arms extending respectively from the front face of one side to the rear face of the other side, and a rod hinged to the arms and adapted to cause the sides to turn inward and outward simultaneously, substantially as described.

4. An animal-poke comprising sides having spurs or projections, means for hingedly connecting the sides, and upright loops extending from the front or outer faces of the sides and arranged to be engaged by the head of a cow, substantially as described.

5. An animal-poke comprising sides having spurs, upper and lower connecting-bars hinged to the sides, arms extending respectively from the front face of one side and from the rear face of the other side, a rod hinged to the arms and connecting the same to cause the sides to turn inward and outward simultaneously, and loops extending longitudinally of the sides and projecting from the outer or front faces thereof, substantially as described.

In testimony that I claim the foregoing as my own I have hereto affixed my signature in the presence of two witnesses.

HORATIO EDWARD DOWNING.

Witnesses:
DAISY DOWNING,
JOHN ROSS.